US011262451B2

(12) United States Patent
Yasui

(10) Patent No.: US 11,262,451 B2
(45) Date of Patent: Mar. 1, 2022

(54) SENSOR INSTALLATION STRUCTURE

(71) Applicant: TOYOTA JIDOSHA KABUSHIKI KAISHA, Toyota (JP)

(72) Inventor: Yohsuke Yasui, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 16/194,739

(22) Filed: Nov. 19, 2018

(65) Prior Publication Data

US 2019/0162845 A1    May 30, 2019

(30) Foreign Application Priority Data

Nov. 28, 2017  (JP) .............................. JP2017-228124

(51) Int. Cl.
| | | |
|---|---|---|
| *G01S 15/02* | (2006.01) | |
| *G01S 7/521* | (2006.01) | |
| *B60R 19/48* | (2006.01) | |
| *G01S 15/931* | (2020.01) | |

(52) U.S. Cl.
CPC ............ *G01S 15/02* (2013.01); *B60R 19/483* (2013.01); *G01S 7/521* (2013.01); *G01S 15/931* (2013.01); *G01S 2015/938* (2013.01)

(58) Field of Classification Search
CPC ........ G01S 15/02; G01S 7/521; G01S 15/931; G01S 2015/938; B60R 19/483
See application file for complete search history.

(56) References Cited

U.S. PATENT DOCUMENTS

| | | | | |
|---|---|---|---|---|
| 4,420,238 A * | 12/1983 | Felix ...................... | F16M 11/08 | |
| | | | 248/183.2 | |
| 4,803,670 A * | 2/1989 | Chen ...................... | G01S 7/521 | |
| | | | 340/904 | |
| 6,085,592 A * | 7/2000 | Kawashima ............ | G01S 7/521 | |
| | | | 367/909 | |
| 6,318,774 B1 * | 11/2001 | Karr ....................... | B60R 19/483 | |
| | | | 293/117 | |
| 6,340,187 B1 * | 1/2002 | Villiere .................. | B60Q 9/006 | |
| | | | 293/117 | |
| 6,750,819 B2 * | 6/2004 | Rahaim .................. | H01Q 1/405 | |
| | | | 342/13 | |
| 6,842,152 B2 * | 1/2005 | Kikuchi ................. | H01Q 1/125 | |
| | | | 343/713 | |

(Continued)

FOREIGN PATENT DOCUMENTS

| | | |
|---|---|---|
| JP | 2008-026231 A | 2/2008 |
| JP | 3164996 U | 12/2010 |

(Continued)

*Primary Examiner* — Isam A Alsomiri
*Assistant Examiner* — Vikas Atmakuri
(74) *Attorney, Agent, or Firm* — Oliff PLC

(57) ABSTRACT

A sensor installation structure includes: a sensor that has a sensing portion that senses periphery information of a vehicle; an exterior member having an opening portion that exposes the sensing portion, the opening portion being configured so as to allow changes in an angle of the sensing portion; and a cover member that is provided at an outer edge portion of the sensing portion, the cover member covering a gap between the outer edge portion of the sensing portion and a peripheral edge portion of the opening portion such that the gap cannot be seen from an exterior.

7 Claims, 7 Drawing Sheets

(56) References Cited

U.S. PATENT DOCUMENTS

| | | | | |
|---|---|---|---|---|
| 7,552,898 B2* | 6/2009 | Demange | B60R 19/483 | 248/27.3 |
| 7,753,419 B2* | 7/2010 | Kondo | B60R 19/483 | 293/117 |
| 7,784,855 B2* | 8/2010 | Faass | B60R 19/483 | 296/187.01 |
| 8,967,316 B2* | 3/2015 | Huth | B60R 21/013 | 180/271 |
| 9,835,719 B2* | 12/2017 | Nguyen | G01S 15/02 | |
| 10,288,730 B2* | 5/2019 | Tsuji | B60R 19/483 | |
| 2002/0190850 A1* | 12/2002 | Nishimoto | G10K 11/004 | 340/435 |
| 2003/0174053 A1* | 9/2003 | Rennick | G01S 7/521 | 340/435 |
| 2005/0242933 A1* | 11/2005 | Loh | B60R 19/483 | 340/435 |
| 2006/0232081 A1* | 10/2006 | Sato | B60R 19/483 | 293/117 |
| 2007/0062292 A1* | 3/2007 | Sato | G10K 11/004 | 73/649 |
| 2007/0194892 A1* | 8/2007 | Schaaf | B60R 19/483 | 340/435 |
| 2009/0140912 A1* | 6/2009 | Kato | G01S 7/4026 | 342/70 |
| 2009/0174535 A1* | 7/2009 | Tang | G01S 7/521 | 340/435 |
| 2010/0182199 A1* | 7/2010 | Jeong | G01S 7/4026 | 342/374 |
| 2012/0119961 A1* | 5/2012 | Mayer Pujadas | H01Q 1/38 | 343/713 |
| 2013/0028053 A1* | 1/2013 | Tsuji | G01S 7/521 | 367/93 |
| 2014/0036632 A1* | 2/2014 | Suyama | B60R 19/483 | 367/99 |
| 2014/0039755 A1* | 2/2014 | Yopp | G01S 7/527 | 701/36 |
| 2015/0123819 A1* | 5/2015 | Chang | G10K 11/004 | 340/943 |
| 2015/0185188 A1* | 7/2015 | Eidel | G01S 15/931 | 73/617 |
| 2015/0198698 A1* | 7/2015 | Wehling | G01S 7/521 | 73/632 |
| 2015/0321548 A1* | 11/2015 | Hori | F01P 7/10 | 180/68.1 |
| 2017/0144710 A1* | 5/2017 | Frayer | H01Q 1/3233 | |
| 2018/0229679 A1* | 8/2018 | Yasui | B60R 19/52 | |

FOREIGN PATENT DOCUMENTS

| | | |
|---|---|---|
| JP | 2017-128220 A | 7/2017 |
| WO | 2012/144270 A1 | 10/2012 |

* cited by examiner

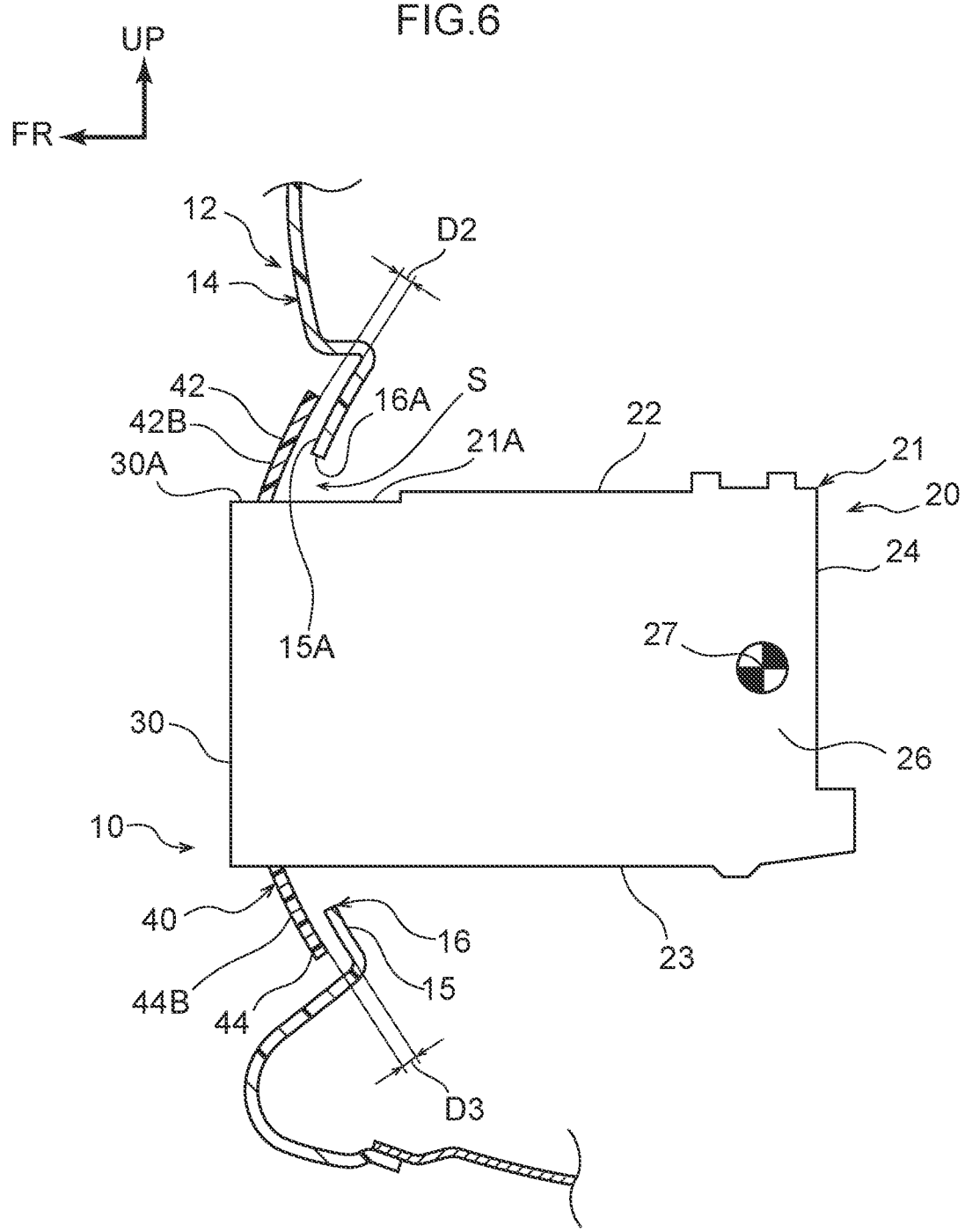

SENSOR INSTALLATION STRUCTURE

CROSS-REFERENCE TO RELATED APPLICATION

This application is based on and claims priority under 35 USC 119 from Japanese Patent Application No. 2017-228124 filed on Nov. 28, 2017, the disclosure of which is incorporated by reference herein.

BACKGROUND

Technical Field

The present disclosure relates to a sensor installation structure.

Related Art

There has conventionally been proposed a sonar sensor mounting structure in which a sonar sensor, which detects the distance to an object of sensing by transmitting ultrasonic waves from a sensing surface of a sensor main body and receiving reflected waves of the ultrasonic waves that have been reflected by the object of sensing, is mounted to a bumper (see, for example, International Publication No. 2012/144270 (Patent Document 1)). In this sonar sensor, a cover portion, which is made of resin and covers the sensing surface, is inserted into a hole portion formed in the bumper, and the outer surface of the cover portion is made to be substantially flush with the outer surface of the bumper.

By the way, there are cases in which, after the sensor is installed in the vehicle, the sensor is tilted and the optical axis thereof is adjusted. Therefore, there are cases in which a gap (margin) for tilting the sensing surface of the sensor is provided between the sensor and the hole portion of the bumper into which the sensing surface is inserted. However, when such a gap is provided, the gap (the interior of the vehicle) can be seen from the exterior of the vehicle, and the external appearance (the look) of the vehicle deteriorates.

SUMMARY

Thus, an object of the present disclosure is to provide a sensor installation structure that enables adjustment of the optical axis of a sensor and that can suppress a deterioration in the external appearance of the vehicle.

A sensor installation structure relating to a first aspect includes: a sensor that has a sensing portion that senses periphery information of a vehicle; an exterior member having an opening portion that exposes the sensing portion, the opening portion being configured so as to allow changes in an angle of the sensing portion; and a cover member that is provided at an outer edge portion of the sensing portion, the cover member covering a gap between the outer edge portion of the sensing portion and a peripheral edge portion of the opening portion such that the gap cannot be seen from an exterior.

In accordance with the first aspect, the opening portion that is formed in the exterior member is open so as allow changes in the angle of the sensing portion of the sensor. Accordingly, optical axis adjustment of the sensing portion of the sensor is possible. Further, the gap between the outer edge portion of the sensing portion and the peripheral edge portion of the opening portion is covered, so as to not be able to seen from the exterior, by the cover member that is provided at the outer edge portion of the sensing portion that is exposed from the opening portion. Accordingly, a deterioration in the external appearance of the vehicle is suppressed, as compared with a structure in which the gap between the outer edge portion of the sensing portion and the peripheral edge portion of the opening portion can be seen from the exterior.

In a sensor installation structure relating to a second aspect, in the sensor installation structure relating to the first aspect, the sensor is mounted to the exterior member.

Here, in a case in which the sensor is mounted to the vehicle body for example, there are cases in which poor sensing arises due to the positions of the sensing portion of the sensor and the opening portion being offset and the sensing portion not being exposed from the opening portion, due to dispersion in the assembly positions of the vehicle body and the exterior member. However, in accordance with the invention of the second aspect, because the sensor is mounted to the exterior member, the dispersion in the assembly positions of the vehicle body and the exterior member do not affect the position of the sensing portion with respect to the opening portion. Namely, the occurrence of poor sensing that is due to the sensing portion of the sensor not being exposed from the opening portion is suppressed.

In a sensor installation structure relating to a third aspect, in the sensor installation structure relating to the first or second aspect, the sensing portion projects-out from the opening portion.

In accordance with the third aspect, the sensing portion of the sensor projects-out from the opening portion. Accordingly, as compared with a case in which the sensing portion of the sensor does not project-out from the opening portion, a region of a wide range is sensed without changing the shapes of the peripheral side portions of the opening portion.

In a sensor installation structure relating to a fourth aspect, in the sensor installation structure relating to any one of the first through third aspects, peripheral side portions of the opening portion at the exterior member are made to be curved surfaces which are convex toward an exterior with the opening portion being a center, and the cover member is formed by curved surfaces that run along the peripheral side portions of the opening portion.

In accordance with the fourth aspect, the cover member is formed by curved surfaces that run along the peripheral side portions of the opening portion. Accordingly, as compared with a case in which the cover member is not formed by curved surfaces that run along the peripheral side portions of the opening portion, even if the angle of the sensing portion is changed (even if the optical axis of the sensing portion is adjusted), fluctuations in the gap between the cover member and the peripheral side portions of the opening portion that face one another are suppressed. Accordingly, foreign matter penetrating into the interior of the vehicle from this gap is suppressed.

In a sensor installation structure relating to a fifth aspect, in the sensor installation structure of any one of the first through fourth aspects, the exterior member is a front grill.

In accordance with the fifth aspect, the exterior member is a front grill. Accordingly, obstacles and the like that are at the front side of the vehicle are sensed accurately.

In accordance with the first aspect, the optical axis of the sensor can be adjusted, and a deterioration in the external appearance of the vehicle can be suppressed.

In accordance with the second aspect, the occurrence of poor sensing that is due to the sensing portion of the sensor not being exposed from the opening portion can be suppressed.

In accordance with the third aspect, a region of a wide range can be sensed without changing the shapes of the peripheral side portions of the opening portion.

In accordance with the fourth aspect, fluctuations in the gap between the cover member and the peripheral side portions of the opening portion that face one another are suppressed, and foreign matter penetrating into the interior of the vehicle from this gap can be suppressed.

In accordance with the fifth aspect, obstacles and the like that are at the front side of the vehicle can be sensed accurately.

BRIEF DESCRIPTION OF THE DRAWINGS

FIG. 6 is a partial, enlarged side view showing a modified example of the sensor installation structure relating to the present embodiment.

DETAILED DESCRIPTION

An embodiment relating to the present disclosure is described in detail hereinafter on the basis of the drawings. Note that, for convenience of explanation, arrow UP that is shown appropriately in the respective drawings indicates the vehicle upward direction, arrow FR indicates the vehicle frontward direction, and arrow RH indicates the vehicle rightward direction. Accordingly, in the following description, when vertical, longitudinal, and left-right directions are used without being specified, they refer to the vertical of the vehicle vertical direction, the longitudinal of the vehicle longitudinal direction, and the left and right of the vehicle left-right direction (the vehicle transverse direction).

Figure 1:
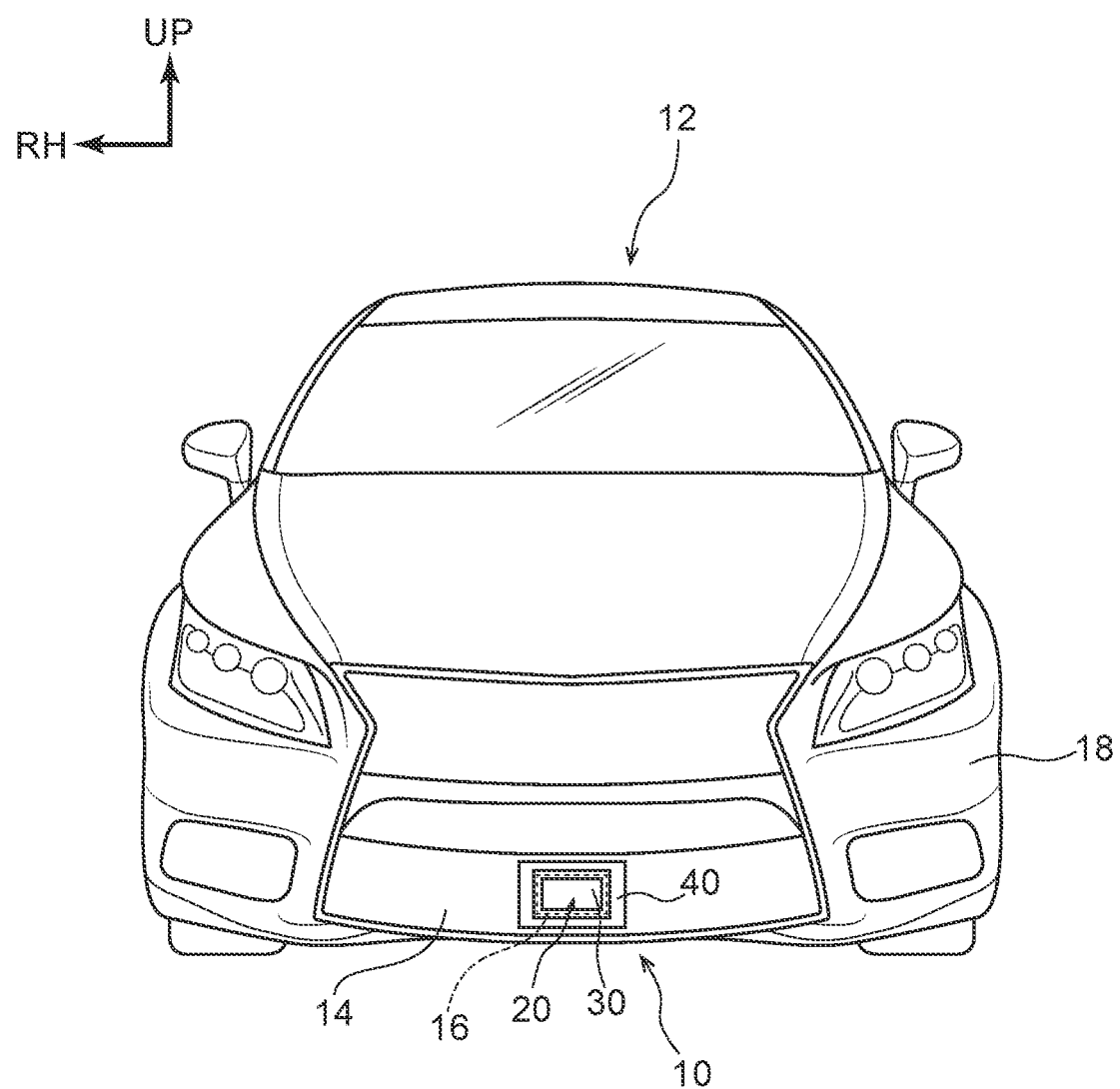
FIG. 1 is a front view showing a vehicle that is provided with a sensor installation structure relating to a present embodiment.
Figure 2:
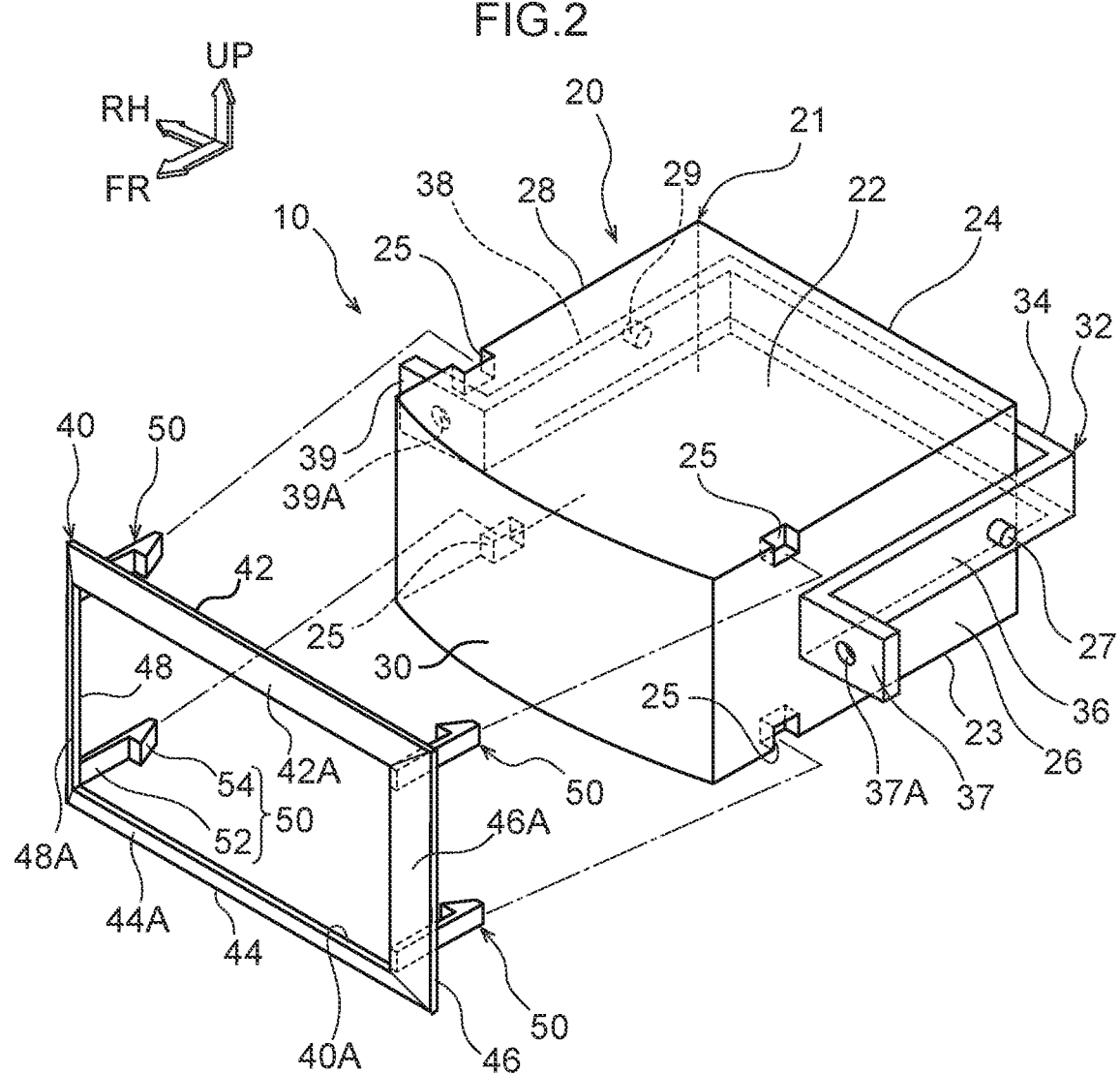
FIG. 2 is a perspective view showing a sensor and a cover member of the sensor installation structure relating to the present embodiment.

As shown in FIG. 1, a sensor 20, which senses periphery information of a vehicle 12 by using infrared laser light for example, is provided at the lower portion of the vehicle transverse direction center of a front grill 14 that serves as an exterior member of the vehicle 12. In further detail, as shown in FIG. 2, the sensor 20 that is for assisting driving (for automatic driving) and that structures a sensor installation structure 10 relating to the present embodiment is structured by a sensor main body (not illustrated) being accommodated within a housing 21 that is substantially rectangular parallelepiped and has a ceiling wall 22, a bottom wall 23, a rear wall 24, a left side wall 26, and a right side wall 28.

The front surface of the sensor main body is exposed toward the front side from the housing 21 interior. This front surface is a sensing portion 30 that is an optical window for sensing that is formed in the shape of a curved surface (directed radially) and that is convex toward the front side as seen in a plan view. The sensing portion 30 transmits therethrough the infrared laser light that is emitted from the sensor main body toward the front side of the vehicle 12. When this infrared laser light hits and is reflected by an obstacle (including a pedestrian), the sensing portion 30 transmits the reflected light therethrough, and receives the reflected light at a light-receiving element (not illustrated) of the sensor main body.

Due thereto, obstacles and the like that are at the front side of the vehicle 12 are sensed by the sensor 20. Note that the sensor 20 (the sensor main body) is electrically connected to a control section (not illustrated) provided at the vehicle 12, and is structured such that the emitting of the infrared laser light is carried out in accordance with control of the control section.

Figure 3:
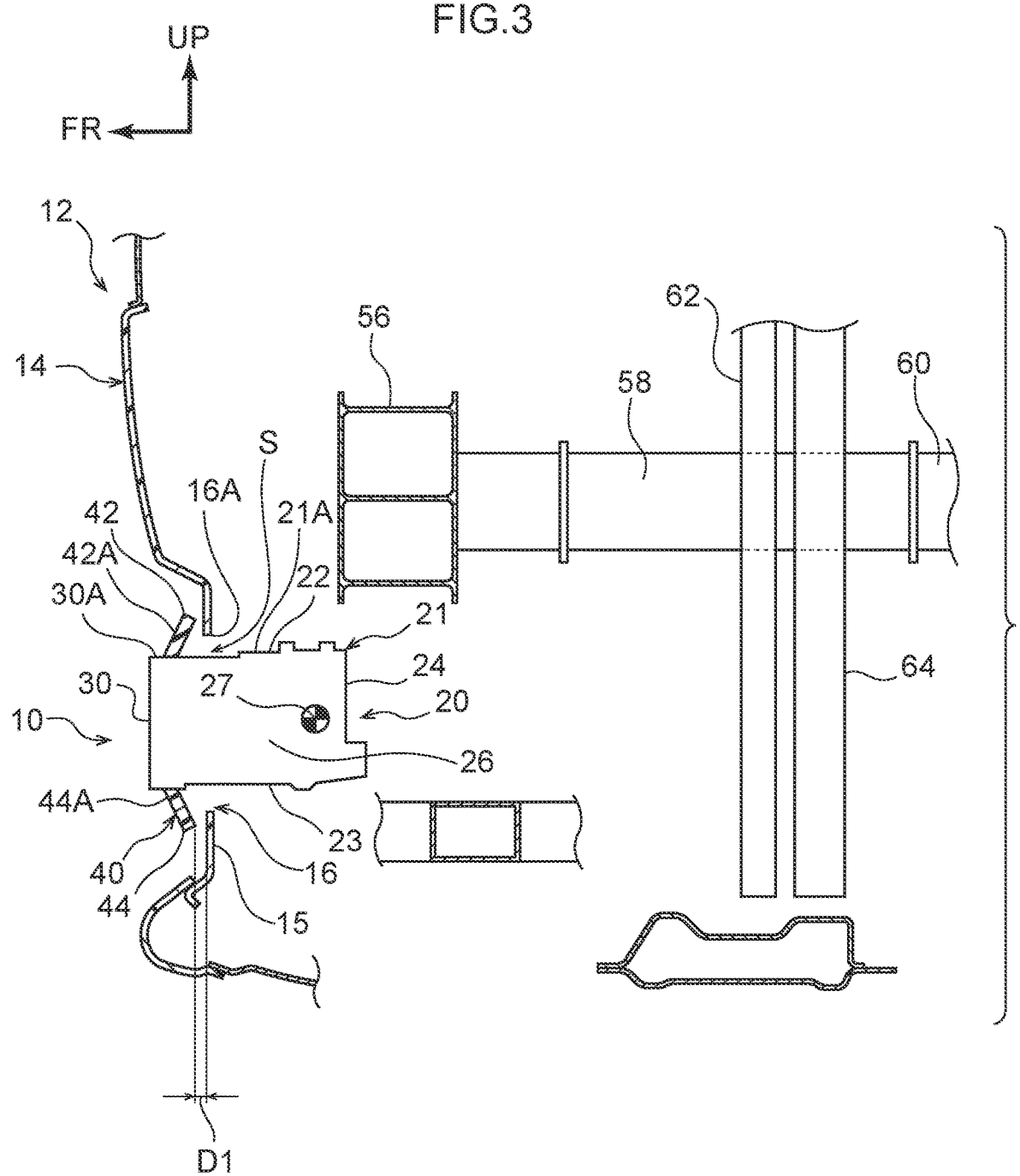
FIG. 3 is a side view showing the sensor installation structure relating to the present embodiment.
Figure 4:
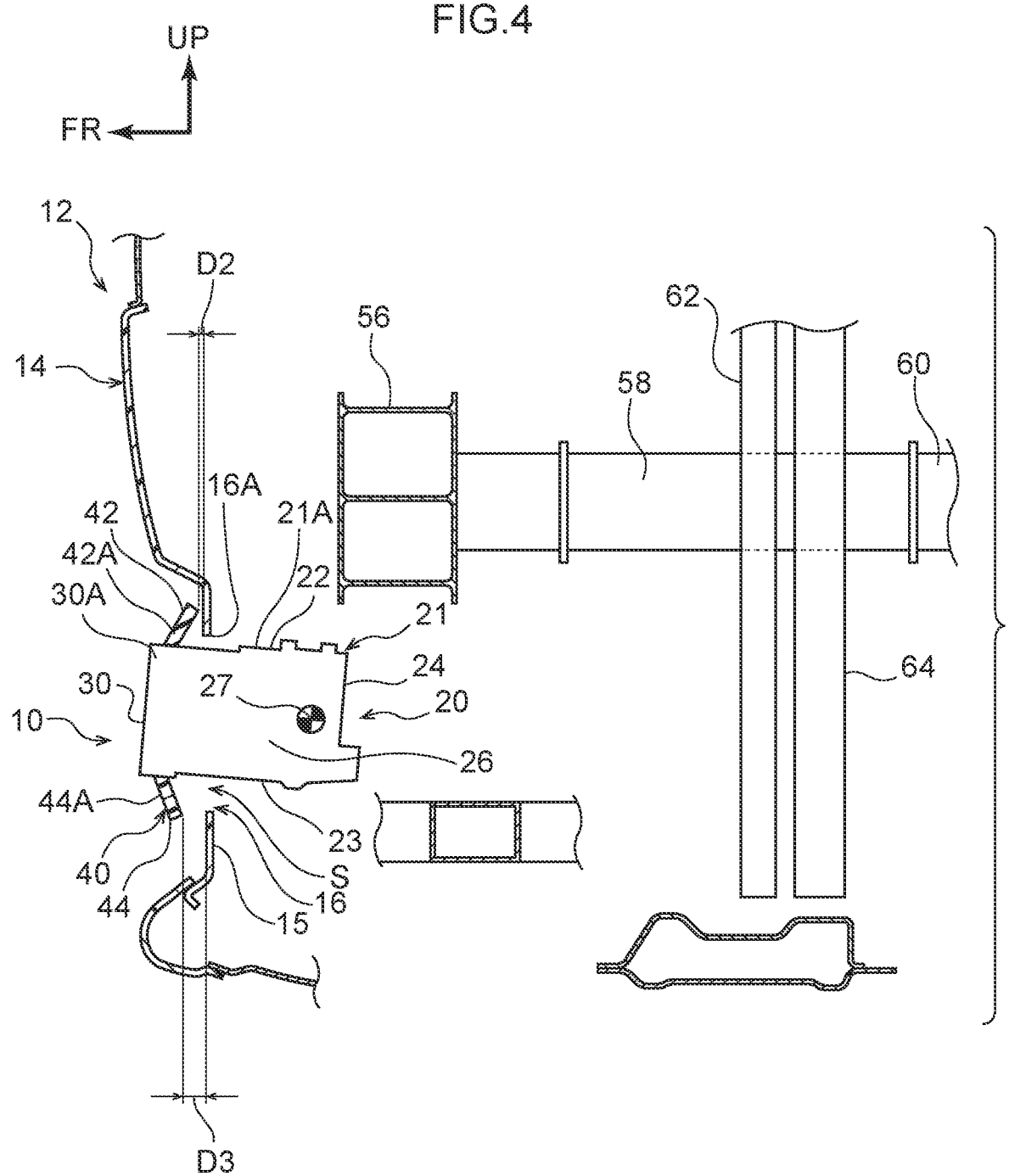
FIG. 4 is a side view showing a state after optical axis adjustment of the sensor installation structure relating to the present embodiment.

Further, the front grill 14 is mounted via a bumper cover 18 (see FIG. 1) to the vehicle body (e.g., a front bumper reinforcement 56 or the like, refer to FIG. 3 and FIG. 4). As shown in FIG. 2, the sensor 20 is mounted to the inner surface of the front grill 14 via a bracket 32.

The bracket 32 is structured by a flat-plate-shaped member that is slender and is formed in a substantial U-shape as seen in a plan view. The bracket 32 has a rear arm 34 that faces the rear wall 24 of the sensor 20 with a predetermined gap therebetween, a left arm 36 that extends toward the front side at a right angle from the left end portion of the rear arm 34 and that faces the left side wall 26 of the sensor 20 with a predetermined gap therebetween, and a right arm 38 that extends toward the front side at a right angle from the right end portion of the rear arm 34 and faces the right side wall 28 of the sensor 20 with a predetermined gap therebetween.

The rear portion of the left side wall 26 and the rear portion of the right side wall 28 of the sensor 20 are pivotally supported by the left arm 36 and the right arm 38, respectively. Namely, the sensor 20 is structured such that the sensing portion 30 side (the front side) thereof can rotate in the vertical direction around a left shaft portion 27 and a right shaft portion 29 that are provided at the rear portion of the sensor 20. Note that the sensor 20 is structured so as to be fixed, by an unillustrated stopper means, at the position that it is rotated to.

A flange portion 37 and a flange portion 39, which extend toward the vehicle transverse direction outer sides respectively, are formed integrally at the front end portion (the distal end portion) of the left arm 36 and the front end portion (the distal end portion) of the right arm 38. The respective flange portions 37, 39 are formed in substantially rectangular shapes whose length directions are the vehicle transverse direction, as seen in a front view. Through-holes 37A, 39A that are circular are formed in the centers of the flange portions 37, 39.

As shown in FIG. 3 through FIG. 5A and FIG. 5B, an opening portion 16, that exposes the sensing portion 30 of the sensor 20 (causes the sensing portion 30 to project-out) and that is open so as to allow changes in the angle of the sensing portion 30, is formed in the lower portion of the vehicle transverse direction center of the front grill 14. Namely, this opening portion 16 is formed substantially in the shape of a rectangle that is one size larger (e.g., a size of 10 mm at the top and bottom respectively and 5 mm at the left and right respectively) than the sensing portion 30, as seen in the front view of FIG. 5A. Screw hole portions (not illustrated) are formed in the inner surface of the front grill 14 at the left and right both sides of the opening portion 16.

Accordingly, the sensor 20 is mounted to the inner surface of the front grill 14 due to the front surfaces of the flange portions 37, 39, which are respectively formed at the front end portions of the bracket 32 (the left arm 36, the right arm 38), being made to abut the inner surface of the front grill 14, and the through-holes 37A, 39A thereof being made to communicate with the screw hole portions, and screws (not illustrated) serving as fasteners being inserted-through the respective through-holes 37A, 39A from the vehicle rear side and being screwed-together with the screw hole portions.

Further, at this time, the sensing portion 30 of the sensor 20 projects-out (is exposed) by a predetermined length (e.g., around 15 mm) toward the vehicle front side from the opening portion 16 (the outer surface of the front grill 14). A gap S for optical axis adjustment (for absorbing dispersion at the time of assembly) is formed between a peripheral edge portion 16A of the opening portion 16 and an outer peripheral portion 21A at the housing 21 of the sensor 20 that faces this peripheral edge portion 16A.

Note that this gap S can also be considered as being a gap between the peripheral edge portion 16A of the opening portion 16 and an outer edge portion 30A of the sensing portion 30 (a portion that includes and is further toward the front side than the portion, at which a cover member 40 described later is disposed, of the outer peripheral portion 21A of the housing 21), as seen in a front view (a front view with respect to the sensing portion 30).

The cover member 40, which is made of resin and covers the gap S that is between the outer peripheral portion 21A and the peripheral edge portion 16A of the opening portion 16 such that the gap S cannot be seen from the exterior, is mounted to the outer peripheral portion 21A (the outer edge portion 30A of the sensing portion 30) of the sensor 20 (the housing 21) that projects-out from the opening portion 16. As shown in FIG. 2, the cover member 40 is a rectangular frame that has an upper frame 42, a lower frame 44, a left frame 46 and a right frame 48. An opening portion 40A at the center of the cover member 40 is formed to a size that is such that the sensing portion 30 of the sensor 20 can be inserted therethrough with hardly any gap therebetween.

Note that polypropylene, acrylonitrile butadiene styrene, and the like are examples of the resin from which the cover member 40 is molded. Further, in a side view seen from the vehicle transverse direction, the upper frame 42 has an inclined surface 42A that is inclined downward toward the vehicle front and lower side, and the lower frame 44 has an inclined surface 44A that is inclined upward toward the vehicle front and upper side (refer to FIG. 3 and FIG. 4 as well). The left frame 46 and the right frame 48 have an inclined surface 46A and an inclined surface 48A that are inclined toward the vehicle front and inner side, respectively, as seen in a plan view (a bottom view).

Moreover, claw portions 50 that project-out toward the vehicle rear side are formed integrally with the inner surface of the cover member 40 at the respective corner portions thereof. Each of the claw portions 50 has a main body portion 52, which is shaped as a flat plate and extends integrally from the inner surface of the cover member 40 at a corner portion thereof and can elastically deform toward the vehicle transverse direction outer side, and an anchoring portion 54, which is substantially shaped as a right triangular pillar and is formed integrally with the distal end (the rear end) of the main body portion 52 and projects-out toward the vehicle transverse direction inner side.

On the other hand, concave portions 25 with which the anchoring portions 54 of the claw portions 50 can engage (fit-together) respectively are formed at predetermined positions (at sides near the outer surface of the front grill 14) of the boundary portion (the corner portion) of the ceiling wall 22 and the left side wall 26, the boundary portion (the corner portion) of the ceiling wall 22 and the right side wall 28, the boundary portion (the corner portion) of the bottom wall 23 and the left side wall 26, and the boundary portion (the corner portion) of the bottom wall 23 and the right side wall 28, which are respective portions of the outer peripheral portion 21A of the sensor 20 (the housing 21) that projects-out from the opening portion 16.

Accordingly, the cover member 40 is fit on the sensor 20 (the housing 21) that projects-out from the opening portion 16, from the vehicle front side of the front grill 14. Namely, the cover member 40 is mounted to the outer peripheral portion 21A at the front portion side (the sensing portion 30 side) of the sensor 20 due to the sensor 20 being relatively inserted-through the opening portion 40A of the cover member 40 from the sensing portion 30 side and the anchoring portions 54 of the respective claw portions 50 being anchored on the respective concave portions 25.

Figure 5A:
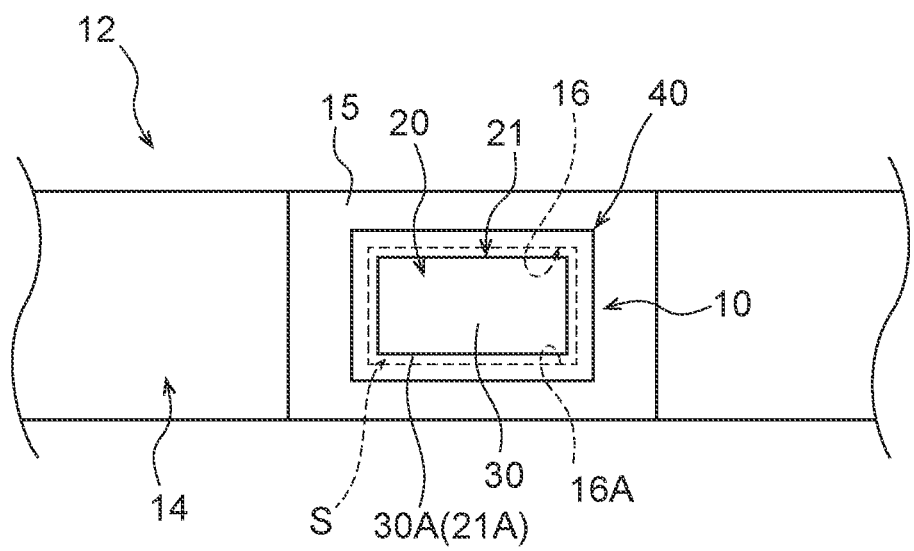
FIG. 5A is a front view corresponding to FIG. 3 and showing, in an enlarged manner, a sensing portion of the sensor installation structure relating to the present embodiment.
Figure 5B:
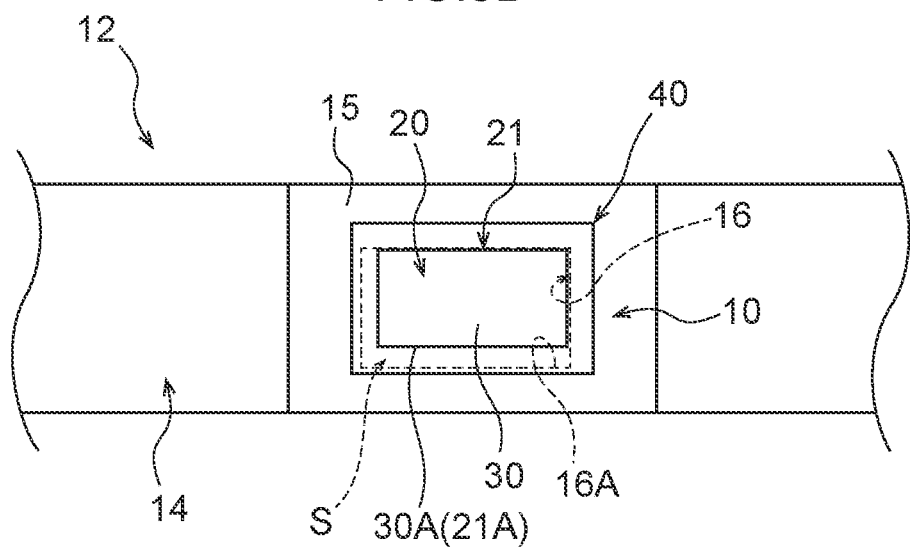
FIG. 5B is a front view corresponding to FIG. 4 and showing, in an enlarged manner, the sensing portion of the sensor installation structure relating to the present embodiment.

Note that, as shown in FIG. 4 and FIG. 5B, the widths of the upper frame 42 and the lower frame 44 of the cover member 40 are respectively formed to be predetermined widths (e.g., around 10 mm to 15 mm) that are such that, even if the sensing portion 30 (the cover member 40) is rotated in the vertical direction, the gap S between the outer peripheral portion 21A (the outer edge portion 30A of the sensing portion 30) of the sensor 20 (the housing 21) and the peripheral edge portion 16A of the opening portion 16 can be covered.

Further, the widths of the left frame 46 and the right frame 48 of the cover member 40 are respectively formed to be predetermined widths (e.g., around 5 mm to 10 mm) that are such that, even if the sensing portion 30 (the cover member 40) is rotated with the vehicle longitudinal direction being the axial direction, the gap S between the outer peripheral portion 21A (the outer edge portion 30A of the sensing portion 30) of the sensor 20 (the housing 21) and the peripheral edge portion 16A of the opening portion 16 can be covered.

Further, as shown in FIG. 3 and FIG. 4, the front bumper reinforcement 56 that extends in the vehicle transverse direction is disposed at the vehicle rear side of the front grill 14. The front bumper reinforcement 56 is supported at a left and right pair of front side members 60 via crash boxes 58. Further, a radiator 62 and a condenser 64 are disposed at the vehicle rear side of the front bumper reinforcement 56.

Operation of the sensor installation structure 10, which relates to the present embodiment and is structured as described above, is described next.

As described above, the sensor 20 is mounted to the front grill 14 due to the sensing portion 30 being inserted in the opening portion 16 of the front grill 14 from the vehicle rear side, and the respective flange portions 37, 39 of the bracket 32 (the left arm 36, the right arm 38) being fastened by screws to the inner surface of the front grill 14. Accordingly, the occurrence of poor sensing due to the sensing portion 30 of the sensor 20 not being exposed (projecting-out) from the opening portion 16 can be suppressed or prevented.

Namely, for example, in a case in which the sensor 20 is mounted to the front bumper reinforcement 56 that serves as the vehicle body, there are cases in which, due to dispersion between the assembly positions of the front bumper reinforcement 56 and the front grill 14, the positions of the sensing portion 30 of the sensor 20 and the opening portion 16 are offset, and the sensing portion 30 is not exposed (does not project-out) from the opening portion 16. In such a case, at the sensor 20, the region that the sensing portion 30 is supposed to sense cannot be ensured, and therefore, poor sensing occurs.

However, in accordance with the sensor installation structure 10 relating to the present embodiment, because the sensor 20 is mounted to the front grill 14, dispersion between the assembly positions of the front bumper reinforcement 56 and the front grill 14 do not affect the position of the sensing portion 30 with respect to the opening portion 16. Namely, the sensing portion 30 of the sensor 20 is always exposed from (always projects-out from) the opening portion 16.

Further, the cover member 40 is provided integrally with the outer peripheral portion 21A (the outer edge portion 30A of the sensing portion 30) of the sensor 20 (the housing 21) that projects-out from the opening portion 16. Namely, the sensing portion 30 is relatively inserted-through the opening portion 40A while the cover member 40 is made to approach the sensor 20 from the vehicle front side of the front grill 14 and the anchoring portions 54 of the claw portions 50 are made to run along the left side wall 26 and the right side wall 28 of the sensor 20 (i.e., the main body portions 52 of the claw portions 50 are elastically deformed toward the vehicle transverse direction outer sides). Then, due to the restoring forces of the main body portions 52 of the claw portions 50, the anchoring portions 54 of the claw portions 50 are anchored on (fit-together with) the concave portions 25.

Due thereto, as shown in FIG. 3 and FIG. 5A, the cover member 40 (the upper frame 42, the lower frame 44, the left frame 46, the right frame 48) is disposed at the outer peripheral portion 21A of the sensor 20 (the outer edge portion 30A of the sensing portion 30). Namely, the gap S between the outer peripheral portion 21A of the sensor 20 and the peripheral edge portion 16A of the opening portion 16 is covered by the cover member 40 such that the gap S (the interior of the vehicle 12) cannot be seen from the exterior. Accordingly, as compared with a case in which the gap S between the outer peripheral portion 21A of the sensor 20 and the peripheral edge portion 16A of the opening portion 16 can be seen from the exterior, a deterioration in the external appearance (the look) of the vehicle 12 can be suppressed or prevented.

Moreover, the opening portion 16 that is formed in the front grill 14 is open to a size that can allow changes in the angle (rotation) of the sensing portion 30 around the left shaft portion 27 and the right shaft portion 29 of the sensor 20. Namely, the opening portion 16 is formed to be one size larger than the sensing portion 30. Accordingly, optical axis adjustment of the sensing portion 30 at the sensor 20 can be carried out.

Further, even if optical axis adjustment of the sensing portion 30 is carried out, the upper frame 42 and the lower frame 44, and the left frame 46 and the right frame 48, of the cover member 40 that follows this sensing portion 30 are respectively formed to predetermined widths. Therefore, as shown in FIG. 4 and FIG. 5B, the gap S between the outer peripheral portion 21A of the sensor 20 (the outer edge portion 30A of the sensing portion 30) and the peripheral edge portion 16A of the opening portion 16 is covered by the cover member 40 such that the gap S cannot be seen from the exterior. Accordingly, even in a case in which optical axis adjustment (changing of the angle) of the sensing portion 30 is carried out, a deterioration in the external appearance (the look) of the vehicle 12 can be suppressed or prevented.

Further, a predetermined length of the sensing portion 30 of the sensor 20 projects-out from the opening portion 16 of the front grill 14. Accordingly, as compared with a case in which the sensing portion 30 does not project-out from the opening portion 16, e.g., a case in which the sensing portion 30 is disposed further toward the vehicle rear side than the opening portion 16 (the inner surface of the front grill 14), a region of a wide range (e.g., a range of a wide angle of 120° or more as seen in a plan view) can be sensed without changing the shapes of peripheral side portions 15 of the opening portion 16 at the front grill 14.

Namely, if the sensing portion 30 of the sensor 20 is disposed further toward the vehicle rear side than the opening portion 16 (the inner surface of the front grill 14), in order to ensure the sensing performance of the sensing portion 30 (the region that the sensing portion 30 is supposed to sense), the need arises to form inclined surfaces (not illustrated), which are directed toward the vehicle body rear and inner side, at the peripheral side portions 15 of the opening portion 16. However, if inclined surfaces are formed at the peripheral side portions 15 of the opening portion 16, the intrinsic function of the front grill 14 deteriorates. Namely, cooling air that is sent toward the radiator 62 is blocked by the inclined surfaces and the amount thereof is reduced.

In contrast, in accordance with the sensor installation structure 10 relating to the present embodiment, because the sensing portion 30 projects-out from the opening portion 16 by a predetermined length, there is no need to form inclined surfaces at the peripheral side portions 15 of the opening portion 16, and the intrinsic function of the front grill 14 does not deteriorate. Namely, a region of a wide range is sensed by the sensing portion 30 without a reduction in the amount of cooling air that is sent to the radiator 62.

Further, if the cover member 40 is formed in a shape having the inclined surfaces 42A, 44A, 46A, 48A, and the peripheral side portions 15 of the opening portion 16 are formed in the shapes of flat plates that run along the vertical direction, as shown in FIG. 3 and FIG. 4, when, for example, the sensing portion 30 side of the sensor 20 is rotated toward the upper side in order to adjust the optical axis, interval D2 between the upper frame 42 and the peripheral side portion 15 of the opening portion 16 that face one another is smaller than interval D1 before the rotation, but interval D3 between the lower frame 44 and the peripheral side portion 15 of the opening portion 16 that face one another is larger than the interval D1 before the rotation. When the interval D3 is large in this way, it is easy for foreign matter or the like to penetrate into the interior of the vehicle 12 therefrom.

Accordingly, as shown in FIG. 6, at least the peripheral side portions 15 at the upper and lower both sides of the opening portion 16 at the front grill 14 may be formed as curved surfaces 15A that are convex toward the exterior (the front side) with the opening portion 16 being the center in a side view seen from the vehicle transverse direction, and curved surfaces 42B, 44B, which run along these peripheral side portions 15 (the curved surfaces 15A) of the opening portion 16, may be formed at least at the upper frame 42, the lower frame 44 of the cover member 40.

In accordance therewith, even if the sensing portion 30 side of the sensor 20 is rotated toward the upper side or the lower side for optical axis adjustment, the interval D2 between the upper frame 42 and the peripheral side portion 15 (the curved surface 15A) of the opening portion 16 that face one another, and the interval D3 between the lower frame 44 and the peripheral side portion 15 (the curved surface 15A) of the opening portion 16, are substantially equal to the interval D1 before rotation (fluctuations in the intervals D2, D3 are suppressed). Therefore, deterioration in the external appearance (the look) of the vehicle 12 can be further suppressed or prevented, and foreign matter and the like penetrating into the interior of the vehicle 12 from the interval D3 for example can be suppressed.

Due to the above-described structure, the sensor 20 is provided at the lower portion of the vehicle transverse direction center of the front grill 14, and, for example, at the time of an automatic driving mode in which the driver is not driving, infrared laser light is illuminated from the sensor 20 toward the front side of the vehicle 12 by control of the control section. When this infrared laser light hits and obstacle (including a pedestrian) and is reflected thereby, the reflected light is received at the sensing portion 30 (the light-receiving element). Due thereto, obstacles (including pedestrians) and the like that are located at the front side of the vehicle 12 can be sensed accurately.

Figure 7:
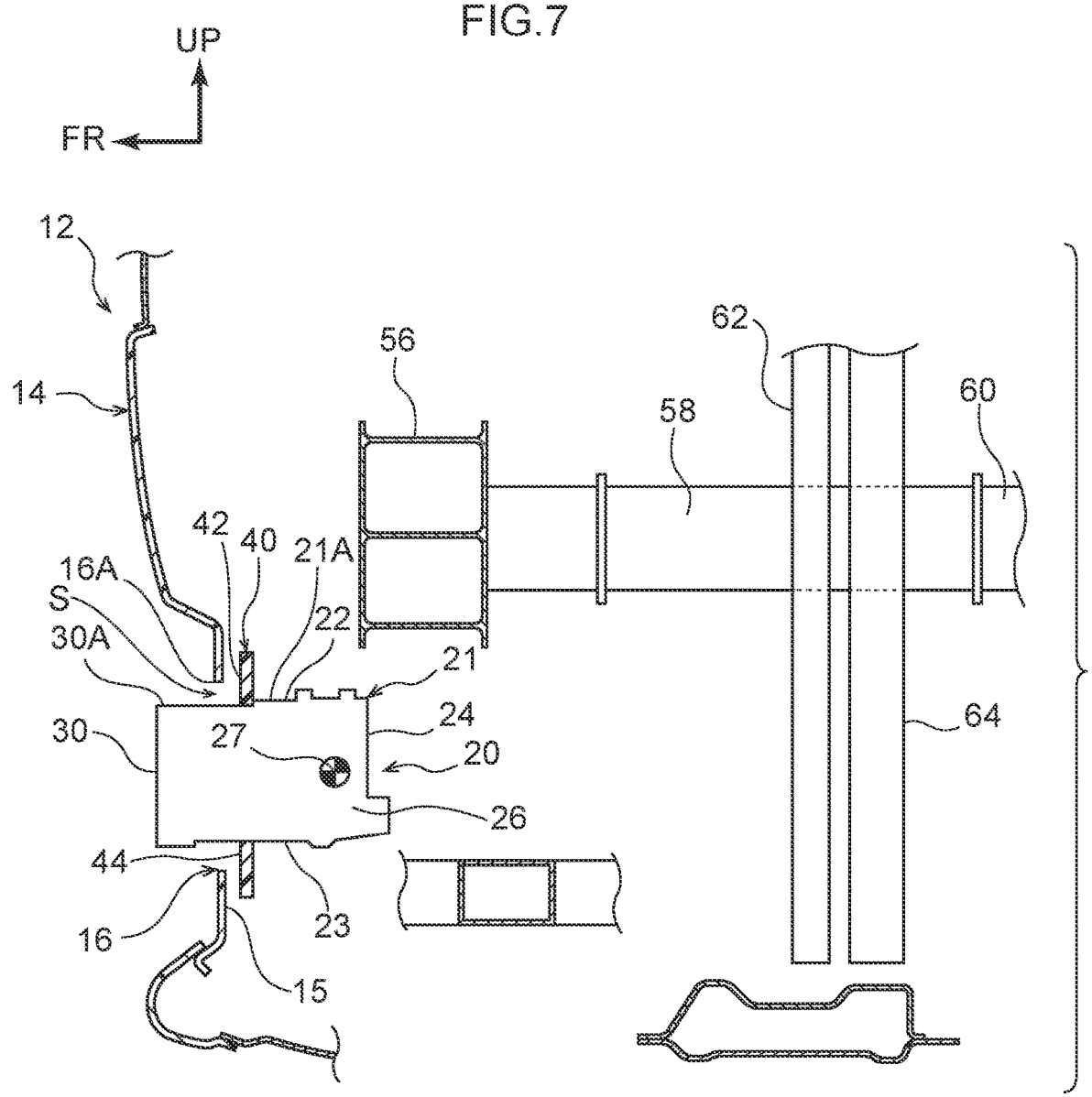
FIG. 7 is a side view showing another sensor installation structure.

Note that, as shown in FIG. 7, the cover member 40 may be formed integrally with the housing 21 of the sensor 20. In this case, it suffices to not form the concave portions 25 at the housing 21 of the sensor 20, and the number of parts can be reduced, and the cover member 40 can be disposed at the inner surface side of the front grill 14. Accordingly, in the same way as in the above-described embodiment, the gap S between the outer peripheral portion 21 of the sensor 20 and the peripheral edge portion 16A of the opening portion 16 cannot be seen from the exterior, but, in this aspect, the external appearance (the look) of the vehicle 12 deteriorates as compared with in the above-described embodiment.

The sensor illumination structure 10 relating to the present embodiment has been described above on the basis of the drawings. However, the sensor illumination structure 10 relating to the present embodiment is not limited to the illustrated structure, and the design thereof can be changed appropriately within a scope that does not depart from the gist of the present disclosure. For example, the sensing light that is illuminated from the sensor main body is not limited to infrared laser light.

Further, in the sensor installation structure 10 relating to the present embodiment, there is a structure in which the optical axis of the sensing portion 30 can be adjusted due to the housing 21 of the sensor 20 being pivotally supported at the bracket 32. However, the sensor installation structure is not limited to this. For example, there may be a structure in which the optical axis of the sensing portion 30 can be adjusted due to the housing 21 of the sensor 20 being fixed to the bracket 32, and the sensor main body being pivotally supported at the housing 21.

What is claimed is:

1. A sensor installation structure comprising:
    a sensor that has a sensing portion that senses periphery information of a vehicle;
    an exterior member having an opening portion that exposes the sensing portion, the opening portion being configured so as to allow changes in an angle of the sensing portion; and
    a cover that is attached at an outer edge portion of the sensing portion that projects forward beyond the opening portion, the cover not contacting the opening portion of the exterior member and covering a gap between the outer edge portion of the sensing portion and a peripheral edge portion of the opening portion such that the gap cannot be seen from an exterior,
    wherein the sensor is mounted to the exterior member in a state in which a sensor angle of the sensor can be changed to adjust an optical axis of the sensor.

2. The sensor installation structure of claim 1, wherein the sensing portion projects-out from the opening portion.

3. The sensor installation structure of claim 1, wherein
    peripheral side portions of the opening portion at the exterior member are made to be curved surfaces which are convex toward the exterior with the opening portion being a center, and
    the cover is formed by curved surfaces that run along the peripheral side portions of the opening portion.

4. The sensor installation structure of claim 2, wherein
    peripheral side portions of the opening portion at the exterior member are made to be curved surfaces which are convex toward the exterior with the opening portion being a center, and
    the cover is formed by curved surfaces that run along the peripheral side portions of the opening portion.

5. The sensor installation structure of claim 1, wherein the exterior member is a front grill.

6. The sensor installation structure of claim 2, wherein the exterior member is a front grill.

7. The sensor installation structure of claim 1, wherein
    the opening portion has an opening size such that the gap between the outer edge portion of the sensing portion and the peripheral edge portion of the opening portion allows changes in the angle of the sensing portion; and
    the cover covers the gap between the outer edge portion of the sensing portion and the peripheral edge portion of the opening portion such that the gap cannot be seen from the exterior when the angle of the sensing portion is changed.

\* \* \* \* \*